US008269939B2

(12) United States Patent
Chiou et al.

(10) Patent No.: US 8,269,939 B2
(45) Date of Patent: Sep. 18, 2012

(54) ACTIVE DEVICE ARRAY SUBSTRATE

(75) Inventors: Yi-Chen Chiou, Taoyuan County (TW); Meng-Chi Liou, Taoyuan County (TW); Chin-Hai Huang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 1084 days.

(21) Appl. No.: 12/183,072

(22) Filed: Jul. 31, 2008

(65) Prior Publication Data

US 2009/0236599 A1 Sep. 24, 2009

(30) Foreign Application Priority Data

Mar. 20, 2008 (TW) .............................. 97109910 A

(51) Int. Cl.
*G02F 1/1345* (2006.01)

(52) U.S. Cl. ......................................... 349/149; 349/54

(58) Field of Classification Search ........................ None
See application file for complete search history.

(56) References Cited

U.S. PATENT DOCUMENTS

| | | | | |
|---|---|---|---|---|
| 6,882,378 | B2 | 4/2005 | Nagata et al. | |
| 2003/0137621 | A1 * | 7/2003 | Zhang et al. | 349/106 |
| 2004/0095549 | A1 | 5/2004 | Moon | |
| 2007/0091249 | A1 * | 4/2007 | Lee et al. | 349/192 |

FOREIGN PATENT DOCUMENTS

| | | |
|---|---|---|
| JP | 2002328397 | 11/2002 |

* cited by examiner

*Primary Examiner* — Lucy Chien
(74) *Attorney, Agent, or Firm* — Jianq Chyum IP Office

(57) ABSTRACT

An active device array substrate at least including a substrate, a plurality of pixel units, a plurality of first signal lines, a first connecting wire, a plurality of first switching devices, and a plurality of second signal lines is provided. The pixel units are disposed within an active area. One ends of two neighboring first signal lines are respectively connected to a first test line and a second test line. The other ends of the two neighboring first signal lines are both connected to the first switching devices. Moreover, the first connecting wire is electrically connected to the first switching devices. One ends of two neighboring second signal lines are respectively connected to a third test line and a fourth test line.

18 Claims, 4 Drawing Sheets

ACTIVE DEVICE ARRAY SUBSTRATE

CROSS-REFERENCE TO RELATED APPLICATION

This application claims the priority benefit of Taiwan application serial no. 97109910, filed on Mar. 20, 2008. The entirety of the above-mentioned patent application is hereby incorporated by reference herein and made a part of this specification.

BACKGROUND OF THE INVENTION

1. Field of the Invention

The present invention generally relates to an active device array substrate, in particular, to an active device array substrate with a test circuit.

2. Description of Related Art

Multi-media technologies are well developed in the current society, which mostly thanks to advancement of semiconductor elements and display devices. In respect to displays, liquid crystal displays (LCDs), characterized by high definition, preferable space utilization, low power consumption, and free of radiation, have gradually become a mainstream products in the market. In order to improve the yield of LCD panels, the test technique for LCD panels gradually attracts more attention.

Generally speaking, the test technique for LCD panels is usually used for testing display areas. In the course of test, if a line defect is found in a display area, it may be determined that the display area has a broken scan line or data line. It should be noted that a broken line in a peripheral area of an LCD panel cannot be found through the conventional test technique. As a result, an external driver circuit board cannot transmit a signal into a display area effectively through the circuit in the peripheral area. Therefore, the LCD panel cannot display normally and the manufacturing yield cannot be effectively improved.

SUMMARY OF THE INVENTION

Accordingly, the present invention is directed to an active device array substrate, which achieves the effect of detecting an abnormal circuit in a peripheral area.

The present invention provides an active device array substrate, which includes an active area and a peripheral area surrounding the active area. The active device array substrate of the present invention includes a substrate, a plurality of pixel units, a plurality of first signal lines, a first connecting wire, a plurality of first switching devices, a plurality of second signal lines, a plurality of second switching devices, and a bus line. The pixel units are disposed in the active area on the substrate, and the first signal lines and the second signal lines are respectively electrically connected to corresponding pixel units. The first signal lines of the present invention are disposed in the active area and extend outwardly into the peripheral area. Moreover, one ends of two neighbouring first signal lines in the peripheral area are respectively connected to a first test line and a second test line, and other ends of the two neighbouring first signal lines are both connected to a first switching device. In addition, the first connecting wire is disposed in the peripheral area and is electrically connected to the first switching devices. The second signal lines of the present invention are disposed in the active area and extend outwardly into the peripheral area. One ends of the two neighbouring second signal lines are respectively connected to a third test line and a fourth test line. The second switching devices are respectively disposed on the first signal lines and the second signal lines in the peripheral area. Furthermore, the bus line is electrically connected to the second switching devices.

In an embodiment of the present invention, the first signal lines are scan lines.

In an embodiment of the present invention, the second signal lines are data lines.

In an embodiment of the present invention, the other ends of the two neighbouring second signal lines are both connected to a third switching device.

In an embodiment of the present invention, the active device array substrate further includes a second connecting wire electrically connected to the third switching device.

In an embodiment of the present invention, the active device array substrate further includes a plurality of pads respectively electrically connected to one ends of the first test line, the second test line, the third test line, and the fourth test line.

In an embodiment of the present invention, the active device array substrate further includes a plurality of pads electrically connected to the first signal lines, and the first switching devices are disposed between the pads and the first connecting wire.

In an embodiment of the present invention, the active device array substrate further includes a plurality of pads electrically connected to the second signal lines, and the third switching devices are disposed between the pads and the second connecting wire.

In an embodiment of the present invention, the first switching devices include thin film transistors.

In an embodiment of the present invention, each of the first switching devices includes a first gate, a first source, and a first drain. The first gate and the first connecting wire are electrically connected, and the first source and the first drain are respectively electrically connected to terminals of the two neighbouring first signal lines.

In an embodiment of the present invention, the second switching devices include thin film transistors.

In an embodiment of the present invention, each of the second switching devices includes a second gate, a second source, and a second drain. The second gate and the bus line are electrically connected, the first signal lines are electrically connected to one of the second sources and the second drains of a part of the second switching devices, and the second signal lines are electrically connected to one of the second sources and the second drains of a part of the second switching devices.

In an embodiment of the present invention, the third switching devices include thin film transistors.

In an embodiment of the present invention, each of the third switching devices includes a third gate, a third source, and a third drain. The third gate is electrically connected to the second connecting wire, and the third source and the third drain are connected to terminals of the two neighbouring second signal lines.

In an embodiment of the present invention, the active device array substrate further includes a fifth test line. One ends of three neighbouring first signal lines are respectively connected to the first test line, the second test line, and the fifth test line, and other ends of three neighbouring first signal lines are respectively connected to two neighbouring first switching devices.

In an embodiment of the present invention, the active device array substrate further includes a sixth test line. One ends of three neighbouring second signal lines are respectively connected to the third test line, the fourth test line, and the sixth test line, and other ends of three neighbouring second signal lines are respectively connected to two neighbouring third switching devices.

In the active device array substrate of the present invention, in the peripheral area, terminals of two neighbouring first signal lines are both connected to a first switching device to form a test circuit, thereby detecting the abnormal circuit in the peripheral area. Moreover, terminals of two neighbouring second signal lines in the peripheral area are also connected to a third switching device, so as to form another test circuit. Therefore, the active device array substrate of the present invention may determine whether a circuit in the peripheral area is abnormal or not through the testing of the test circuits.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
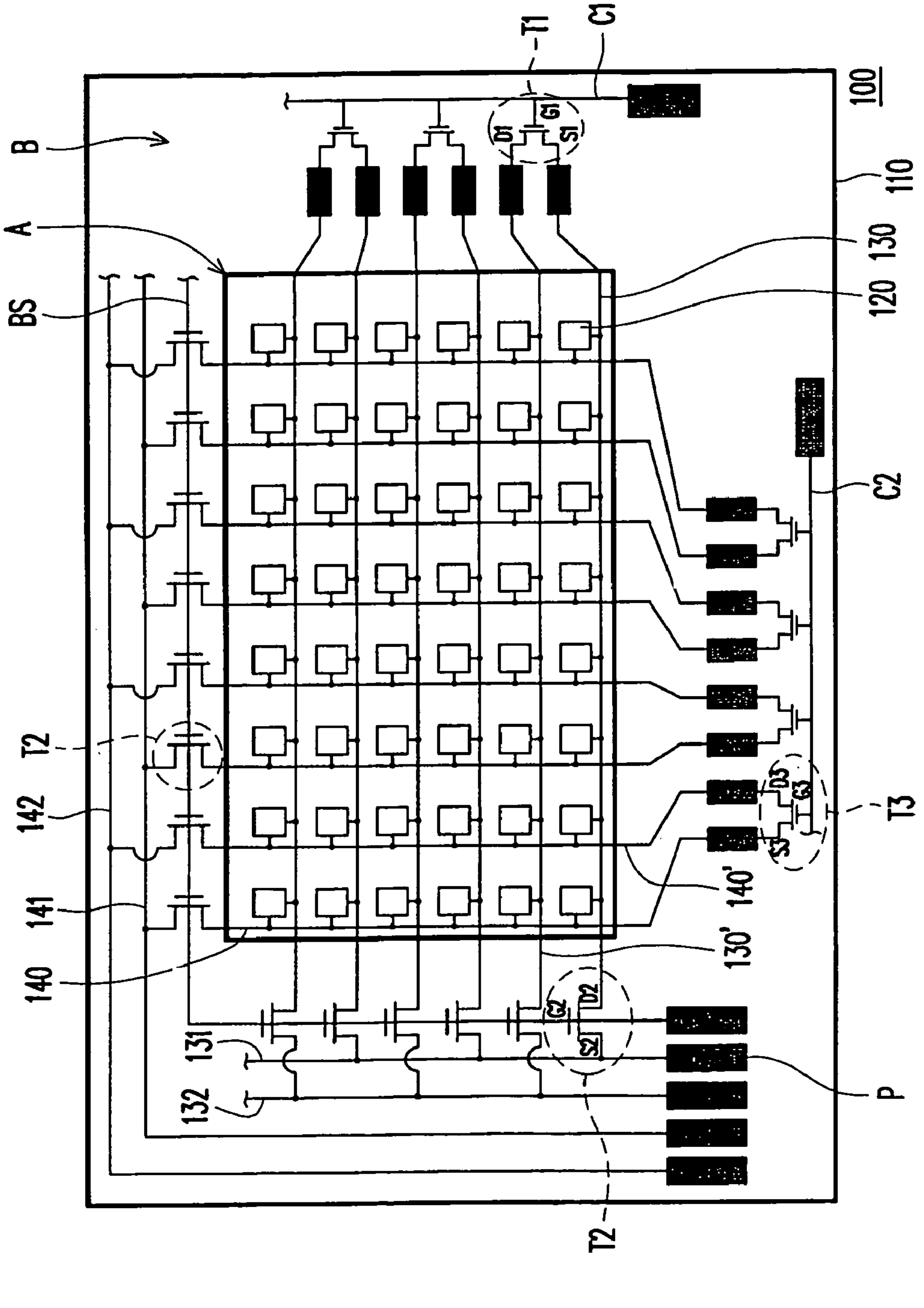
FIG. 1 is a schematic view of a circuit of an active device array substrate according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

The First Embodiment

FIG. 1 is a schematic view of a circuit of an active device array substrate according to a first embodiment of the present invention. Referring to FIG. 1, the active device array substrate 100 includes an active area A and a peripheral area B surrounding the active area A. In detail, the active device array substrate 100 at least includes a substrate 110, a plurality of pixel units 120, a plurality of first signal lines 130, a plurality of second signal lines 140, a plurality of first switching devices T1, a plurality of second switching devices T2, a first connecting wire C1, and a bus line BS. The pixel units 120 are disposed in an array in the active area A on the substrate 110. Moreover, the first signal lines 130 and the second signal lines 140 are alternately disposed in the active area A, and all extend outwardly into the peripheral area B. In the active area A, the first signal lines 130 and the second signal lines 140 are respectively electrically connected to the corresponding pixel units 120. In an embodiment, the first signal lines 130 may be scan lines, and the second signal lines 140 are data lines.

It should be noted that two neighbouring first signal lines 130 and 130' extend into one end of the peripheral area B and are respectively connected to a first test line 131 and a second test line 132. In particular, the two neighbouring first signal lines 130 and 130' extend into the other end of the peripheral area B and are both connected to a first switching device T1. In specific, the first switching devices T1 may be thin film transistors, and each of the first switching devices T1 mainly include a first gate G1, a first source S1, and a first drain D1. The first gate G1 of each of the first switching devices T1 is electrically connected to the first connecting wire C1, and the first source S1 and the first drain D1 are respectively connected to terminals of the two neighbouring first signal lines 130 and 130'. On the other hand, two neighbouring second signal lines 140 and 140' extend into one end of the peripheral area B and are respectively connected to a third test line 141 and a fourth test line 142.

The second switching devices T2 are respectively disposed on the first signal lines 130 and the second signal lines 140 in the peripheral area B. The second switching devices T2 may be thin film transistors, and each of the second switching devices T2 mainly include a second gate G2, a second source S2, and a second drain D2. It should be noted that the bus line BS may be electrically connected to the second gates G2 of the second switching devices T2.

On the other hand, a part of the second switching devices T2 are electrically connected between the first signal lines 130 and the first test line 131 through the second sources S2 and the second drains D2. A part of the second switching devices T2 are electrically connected between the first signal lines 130 and the second test line 132 through the second sources S2 and the second drains D2. Similarly, a part of the second switching devices T2 are electrically connected between the second signal lines 140 and the third test line 141, and a part of the second switching devices T2 are electrically connected between the second signal lines 140 and the fourth test line 142.

Thus, the active device array substrate 100 has been substantially introduced. Then, the testing of the active area A and the peripheral area B of the active device array substrate 100 will be introduced hereinafter. Definitely, those of ordinary skill in the art may adopt different test methods in consideration of different test purposes, and the examples herein are merely for illustration instead of limitation. It should be noted that the active device array substrate 100 has been assembled with a color filter substrate before undergoing the test. For the sake of simplicity of drawings, the color filter substrate will be omitted in the following drawings and description. If the active device array substrate 100 adopts a COA (color filter on array) technique, the active device array substrate 100 is only assembled with a transparent substrate.

In an embodiment, when the active device array substrate 100 needs testing on the active area A, the first switching devices T1 are turned off. On the other hand, a signal is transmitted to the second gates G2 through the bus line BS to turn on each of the second switching devices T2. Next, the first test line 131 and the second test line 132 transmit a switch signal to each of the pixel units 120. On the other hand, the third test line 141 and the fourth test line 142 transmit a display signal to enable the pixel units 120 to display.

Figure 2A:
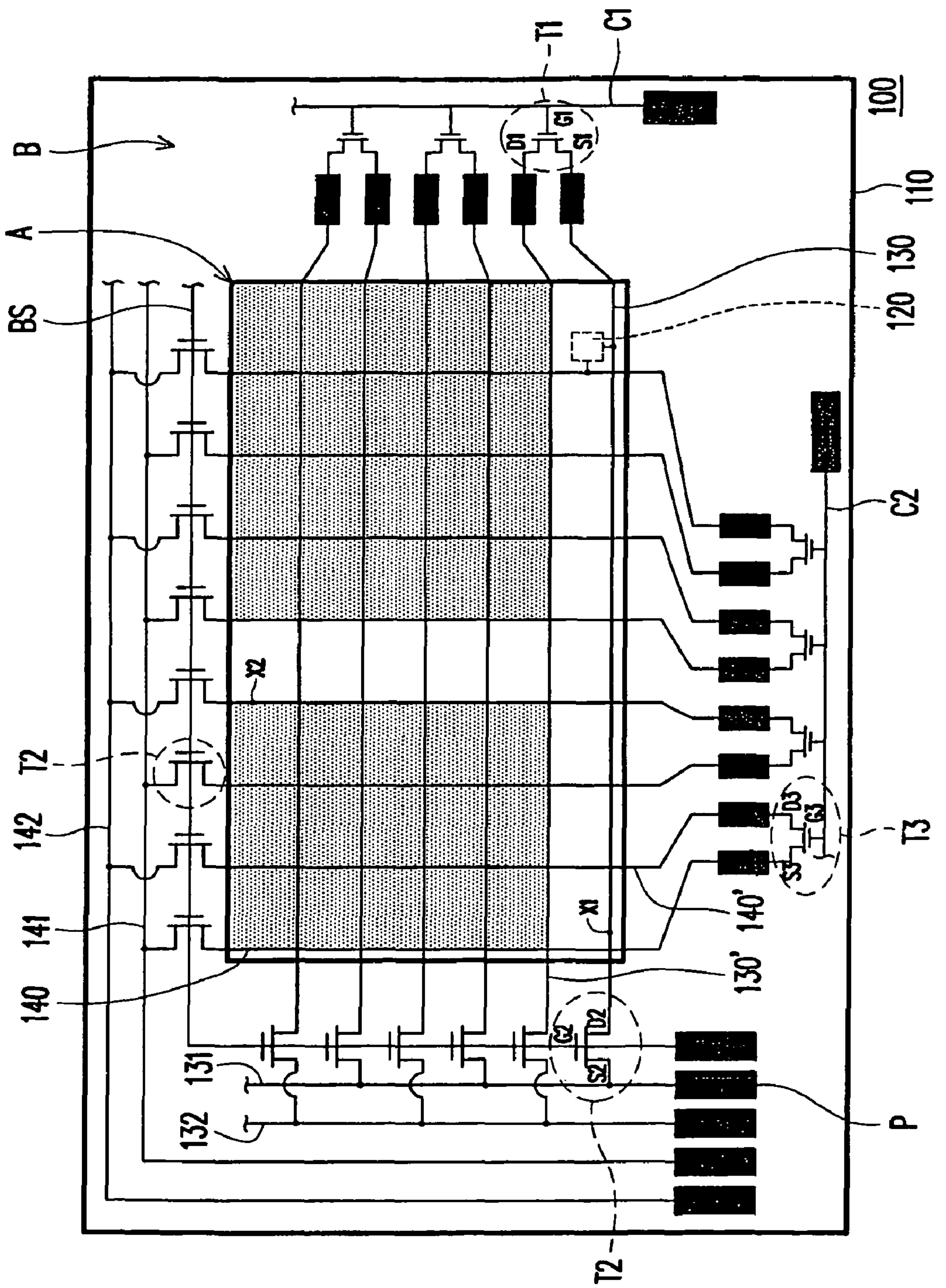
FIG. 2A is a schematic view illustrating an active device array substrate having a line defect according to the first embodiment of the present invention.

FIG. 2A is a schematic view illustrating an active device array substrate having a line defect according to the first embodiment of the present invention. Referring to FIG. 2A, when being set to a normally white, if a line defect appears in a row of the pixel units 120 behind the position X1 of the display frame, it means that the first signal line 130 is broken at the position X1. On the other hand, if a line defect appears in a column of the pixel units 120 behind the position X2 of the display frame, it means that the second signal line 140 is broken at the position X2. Operators can make laser repair on the positions X1 and X2 where the line is broken.

Figure 2B:
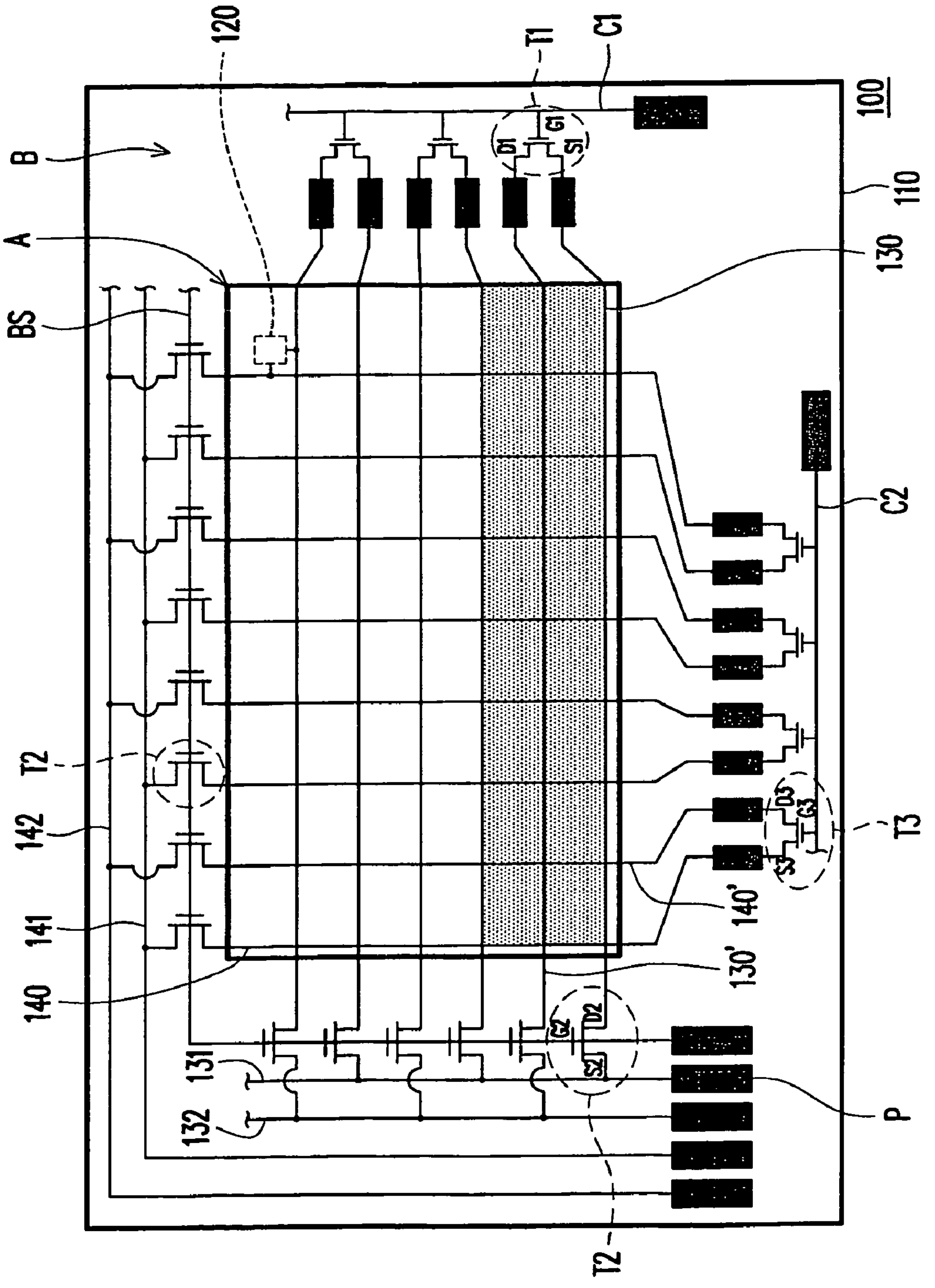
FIG. 2B is a schematic view illustrating the testing of a circuit in a peripheral area according to the first embodiment of the present invention.

If the active area A of the active device array substrate 100 is tested to be normal, the circuit in the peripheral area B is then tested. Referring to FIG. 2B, the first connecting wire C1 may transmit a signal to turn on the first switching devices T1. When the first switching devices T1 are turned on, ideally, the neighbouring first signal lines 130 and 130' may be communicated with each other. When set to be normally white, if the first signal lines 130 transmit a signal to the pixel units 120 to enable the pixel units 120 electrically connected to the first signal lines 130' to display normally (see the black blocks in FIG. 2B), it means that the circuit in the peripheral area B is in a normal state. Otherwise, the circuit in the peripheral area B is broken. In this manner, the circuits in the active area A or the peripheral area B may be tested through the aforementioned test method to determine whether they are normal or not.

In order to test the circuits at different positions in the peripheral area B, the two neighbouring second signal lines 140 and 140' extending to the other end of the peripheral area B may also be both connected to a third switching device T3. The third switching devices T3 may also be electrically connected through a second connecting wire C2. In detail, the third switching devices T3 may be thin film transistors, and each mainly include a third gate G3, a third source S3, and a third drain D3. The third gate G3 is electrically connected to the second connecting wire C2, and the third source S3 and the third drain D3 are respectively connected to terminals of the two neighbouring second signal lines 140 and 140'.

Furthermore, the active device array substrate 100 may further include a plurality of pads P. The pads P may be respectively electrically connected to one ends of the first test line 131, the second test line 132, the third test line 141, and the fourth test line 142. As shown in FIG. 1, a part of pads P may also be electrically connected to the first signal lines 130, and the first switching devices T1 are disposed between the pads P and the first connecting wire C1. On the other hand, a part of the pads P may be electrically connected to the second signal lines 140 and the third switching devices T3 are disposed between the pads P and the second connecting wire C2.

The Second Embodiment

Figure 3:
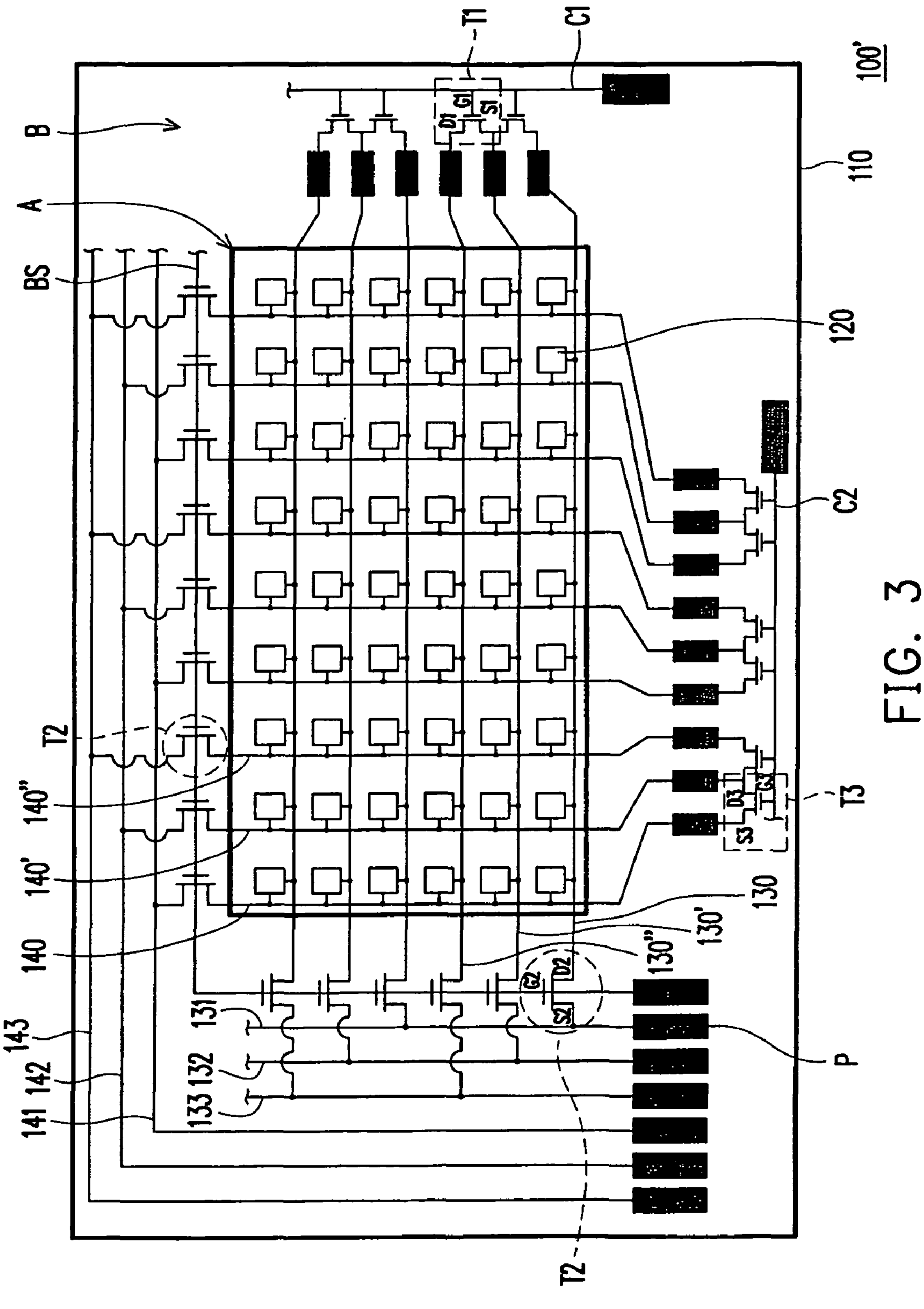
FIG. 3 is a schematic view of a circuit of an active device array substrate according to a second embodiment of the present invention.

The second embodiment is similar to the first embodiment, and the differences there between mainly reside in an electrical connection manner between the first switching devices T1 and the first signal lines 130 and an electrical connection manner between the third switching devices T3 and the second signal lines 140. FIG. 3 is a schematic view of a circuit in the active device array substrate according to the second embodiment of the present invention. Referring to FIG. 3, the layout of the active device array substrate 100' is similar to that of the active device array substrate 100 in the first embodiment, and will not be illustrated herein. It should be noted that the numbers of the pads P and the test lines on the active device array substrate 100' in the second embodiment are different from those of the first embodiment.

In detail, the active device array substrate 100' in this embodiment further includes a fifth test line 133 and a sixth test line 143. One ends of three neighbouring first signal lines 130, 130', and 130" are respectively connected to the first test line 131, the second test line 132, and the fifth test line 133. The other ends of the three neighbouring first signal lines 130, 130', and 130" are respectively connected to two neighbouring first switching devices T1.

On the other hand, one ends of three neighbouring second signal lines 140, 140', and 140" are respectively connected to the third test line 141, the fourth test line 142, and the sixth test line 143. The other ends of the three neighbouring second signal lines 140, 140', and 140" are respectively connected to the two neighbouring third switching devices T3. In other words, two neighbouring first switching devices T1 may be connected to the same first signal line 130 trough the pads P. Moreover, two neighbouring third switching devices T3 may also be connected to the same second signal line 140 through the pads P. The active device array substrate 100' of the second embodiment achieves the same effect of the active device array substrate 100 of the first embodiment.

In view of the above, three neighbouring first signal lines extending into one end of the peripheral area are connected to two first switching devices to form a test circuit, thereby testing whether the circuit in the peripheral area is abnormal or not. Furthermore, three neighbouring second signal lines extending into one end of the peripheral area may also be connected to two third switching devices, so as to form another test circuit. Therefore, the active device array substrate may determine whether the circuit in the peripheral area is abnormal or not through the testing of the test circuits.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active device array substrate, comprising:

a substrate comprising an active area and a peripheral area surrounding the active area;

a plurality of pixel units, disposed in the active area on the substrate;

a plurality of first switching devices, disposed in the peripheral area;

a plurality of second switching devices, disposed in the peripheral area;

a plurality of first signal lines, disposed in the active area and extending outwardly into the peripheral area, wherein one ends of two neighbouring first signal lines in the peripheral area are respectively connected to a first test line and a second test line through two of the second switching devices, and other ends of two neighbouring first signal lines are both connected to one of the first switching devices;

a first connecting wire, disposed in the peripheral area and electrically connected to the first switching devices;

a plurality of second signal lines, disposed in the active area and extending outwardly into the peripheral area, wherein the first signal lines and the second signal lines are respectively electrically connected to the corresponding pixel units, and one ends of two neighbouring second signal lines are respectively connected to a third test line and a fourth test line through two of the second switching devices; and a bus line, electrically connected to the second switching devices, and transmitting a signal to turn on each of the second switching devices.

2. The active device array substrate according to claim 1, wherein the first signal lines are scan lines.

3. The active device array substrate according to claim 2, wherein the second signal lines are data lines.

4. The active device array substrate according to claim 1, wherein the other ends of two neighbouring second signal lines are both connected to a third switching device.

5. The active device array substrate according to claim 1, further comprising a second connecting wire electrically connected to a plurality of third switching devices.

6. The active device array substrate according to claim 1, further comprising a plurality of pads respectively electrically connected to one end of the first test line, the second test line, the third test line, and the fourth test line.

7. The active device array substrate according to claim 1, further comprising a plurality of pads electrically connected to the first signal lines, wherein the first switching devices are disposed between the pads and the first connecting wire.

8. The active device array substrate according to claim 5, further comprising a plurality of pads electrically connected to the second signal lines, wherein the third switching devices are disposed between the pads and the second connecting wire.

9. The active device array substrate according to claim 1, wherein the first switching devices comprise thin film transistors.

10. The active device array substrate according to claim 9, wherein each of the first switching devices comprises a first gate, a first source, and a first drain, the first gate and the first connecting wire are electrically connected, and the first source and the first drain are respectively connected to terminals of two neighbouring first signal lines.

11. The active device array substrate according to claim 1, wherein the second switching devices comprise thin film transistors.

12. The active device array substrate according to claim 11, wherein each of the second switching devices comprises a second gate, a second source, and a second drain, the second gate is electrically connected to the bus line, the first signal lines are electrically connected to one of the second sources and the second drains of a part of the second switching devices, and the second signal lines are electrically connected to one of the second sources and the second drains of a part of the second switching devices.

13. The active device array substrate according to claim 4, wherein the third switching devices comprise thin film transistors.

14. The active device array substrate according to claim 13, wherein each of the third switching devices comprises a third gate, a third source, and a third drain, the third gates are electrically connected to the second connecting wire, and the third sources and the third drains are respectively connected to terminals of two neighbouring second signal lines.

15. The active device array substrate according to claim 1, further comprising a fifth test line, wherein one ends of three neighbouring first signal lines are respectively connected to the first test line, the second test line, and the fifth test line, and other ends of three neighbouring first signal lines are respectively connected to two neighbouring first switching devices.

16. The active device array substrate according to claim 4, further comprising a sixth test line, wherein one ends of three neighbouring second signal lines are respectively connected to the third test line, the fourth test line, and the sixth test line, and other ends of three neighbouring second signal lines are respectively connected to two neighbouring third switching devices.

17. An active device array substrate, comprising an active area and a peripheral area surrounding the active area, the active device array substrate comprising:

a substrate;

a plurality of pixel units, disposed in the active area on the substrate;

a plurality of first signal lines, disposed in the active area and extending outwardly into the peripheral area, wherein one ends of two neighbouring first signal lines in the peripheral area are respectively connected to a first test line and a second test line, and other ends of two neighbouring first signal lines are both connected to a first switching device;

a first connecting wire, disposed in the peripheral area and electrically connected to the first switching devices;

a plurality of second signal lines, disposed in the active area and extending outwardly into the peripheral area, wherein the first signal lines and the second signal lines are respectively electrically connected to the corresponding pixel units, and one ends of two neighbouring second signal lines are respectively connected to a third test line and a fourth test line;

a plurality of second switching devices, respectively disposed on the first signal lines and the second signal lines in the peripheral area;

a bus line, electrically connected to the second switching devices; and a fifth test line, wherein one ends of three neighboring first signal lines are respectively connected to the first test line, the second test line, and the fifth test line, and other ends of three neighboring first signal lines are respectively connected to two neighboring first switching devices.

18. The active device array substrate according to claim 17, further comprising:

the other ends of two neighbouring second signal lines are both connected to a third switching device; and a sixth test line, wherein one ends of three neighbouring second signal lines are respectively connected to the third test line, the fourth test line, and the sixth test line, and other ends of three neighbouring second signal lines are respectively connected to two neighbouring third switching devices.

* * * * *